United States Patent Office 3,384,645
Patented May 21, 1968

3,384,645
7-METHYLENE-3α,5-CYCLO-6-KETONE STEROIDS AND PROCESS FOR PRODUCING SAME
Derek Burn and Vladimir Petrow, London, England, assignors to The British Drug Houses Limited
No Drawing. Filed Nov. 22, 1965, Ser. No. 509,170
Claims priority, application Great Britain, Dec. 3, 1964, 49,166/64
6 Claims. (Cl. 260—397.3)

ABSTRACT OF THE DISCLOSURE

New 7-methylene-3α,5-cyclo-6-ketone steroids and process for producing same comprising reacting a corresponding steroidal 3α,5-cyclo-6-ketone with formaldehyde and the salt of a secondary amine.

This invention is for improvements in or relating to organic compounds and has particular reference to a novel class of steroidal derivatives having a methylene group at position seven.

It is an object of the present invention to provide novel steroidal materials having a 7-methylene group, which may be represented by the partial Formula I. The compounds of the present invention of partial Formula I are of value on account of their biological properties. Thus, for example, the derivatives of 17β-hydroxy androstane which may additionally be substituted at $C_{17}$ may possess anabolic and claudogenic properties. The derivatives of 17α-acyloxypregnan-20-one, which fall within the scope of the present invention, may possess claudogenic and progestational properties. The compounds of the present invention are also of value as intermediates.

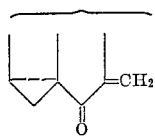

(I)

According to the present invention there is provided a process for the preparation of 7-methylene steroids having in Rings A and B of the steroid nucleus the structure (I) above, which process comprises reacting a steroidal 3α,5-cyclo-6-ketone having in Rings A and B of the steroid nucleus the structure

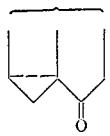

(II)

with formaldehyde and the salt of a secondary amine.

The starting materials, having the partial structure (II) are readily prepared by methods well known in the art to which this invention pertains and are described, for example, in Steroids, Fieser & Fieser, Reinhold Publishing Corp. New York, pp. 314 et seq. In carrying out the process of the present invention the starting material, having the partial structure (II), is submitted to a Mannich type reaction with formaldehyde, conveniently in the form of its solid polymer paraformaldehyde, and a salt of a secondary amine such, for example, as dimethylamine hydrochloride, diethylamine hydrochloride or piperidine hydrochloride in an inert solvent such as a lower aliphatic alcohol or dioxan. The reaction is preferably carried out at temperatures between 70 to 100° C., when it is generally complete in 1 to 6 hours. It is a surprising feature of the present invention that the product obtained is a 3α,5-cyclo-7-methylene-6-one, and not the anticipated aminomethylated product normally formed in a Mannich reaction.

The process of the invention may be applied to a wide variety of steroidal 3α,5-cyclo-6-ones which may be of the androstane, 19-norandrostane, pregnane, 19-nor-pregnane, cholestane and spirostane series, additionally substituted by such groups as:

Hydroxyl and acyloxy groups and functional derivatives thereof at $C_{11}$, $C_{12}$, $C_{14}$, $C_{15}$, $C_{16}$, $C_{17}$, $C_{20}$ and $C_{21}$, including the condensation products of 16α,17α-glycols with carbonyl components.

Carbonyl groups at $C_{11}$, $C_{12}$, $C_{15}$, $C_{16}$, $C_{17}$ and $C_{20}$ which may require conversion into a protected form prior to application of the process of the present invention. Such protected forms may include the derived hydroxy-compound, ketals, enol ethers and enamines.

Alkyl groups, and in particular methyl groups at $C_{11}$, $C_{12}$, $C_{16}$, $C_{17}$ and $C_{18}$ and ethyl groups at $C_{17}$. Lactone and ether residues such as —O.CO.CH$_2$.CH$_2$— at $C_{17}$, ether groups at $C_{16}$ and bridging $C_{18}$ and $C_{20}$.

Halogen groups such as chlorine and fluorine at $C_9$, $C_{16}$ and $C_{21}$.

Unsaturated linkages, for example, at $C_{11}$.

Following is a description by way of example of methods of carrying the invention into effect.

Example 1.—17α-methyl-7-methylene-3α,5-cyclo-androstan-17β-ol-6-one

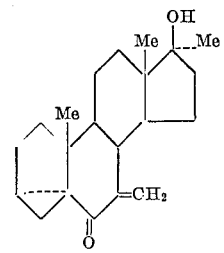

To a solution of magnesium methyl bromide (prepared from methyl bromide (8 ml.) and magnesium turnings (3.3 g.)) in dry ether (75 ml.) was added a solution of 6β-hydroxy-3,5-cycloandrostan-17-one (10 g.) (Ber., 1942, 75, 591) in dry ether (100 ml.) and the mixture was stirred at room temperature overnight. Aqueous ammonium chloride was added, the ether layer was separated, washed with water, dried (Na$_2$SO$_4$) and evaporated. Crystallisation of the residue from acetone gave 17α-methyl-3α,5-cycloandrostane-6β,17β-diol, M.P. 170–172° C., $[\alpha]_D^{25}$+13.5° (c., 1.1 in dioxan).

A solution of the foregoing product (7 g.) in pyridine (70 ml.) was added to a suspension of the complex prepared from chromium trioxide (7 g.) and pyridine (70 ml.) and the mixture was kept at room temperature overnight. The precipitate was filtered off and washed with ethyl acetate. The combined filtrate and washings were washed with dilute hydrochloric acid, dilute sodium carbonate and water, dried (Na$_2$SO$_4$) and evaporated to dryness. Crystallisation of the residue from methanol gave 17α-methyl-3α,5-cycloandrostan-17β-ol-6-one, M.P. 203–205° C., $[\alpha]_D^{26}$+11.2° (c. 0.7 in chloroform).

A mixture of the foregoing product (2 g.), paraformaldehyde (1 g.), dimethylamine hydrochloride (3.4 g.) and dry dioxan (30 ml.) was heated under reflux for 3½ hours and then poured into water. The precipitated solid was recrystallised from diisopropyl ether to give 17α-methyl - 7-methylene - 3α,5-cycloandrostan - 17β-ol-6-one M.P. 147–147.5° C., [α]$_D^{25}$+10.2° (c. 1.0 dioxan). The compound has some anabolic properties and no androgenic properties.

Example 2.—17β-acetoxy-7-methylene-3α,5-cycloandrostan-6-one

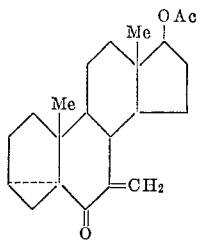

A mixture of 17β-acetoxy-3α,5-cycloandrostan-6-one (2 g.) (J. Chem. Soc., 1957, 4105), paraformaldehyde (1 g.), dimethylamine hydrochloride (3.4 g.) and dioxan (25 ml.) was heated under reflux for 1½ hours. The product obtained on pouring the reaction mixture into water was crystallised from methanol to give 17β-acetoxy-7-methylene-3α,5-cycloandrostan-6-one, M.P. 123–124° C., [α]$_D^{25}$+36.7° (c. 0.5 in dioxan).

Example 3.—17α-acetoxy-7-methylene-3α,5-cyclopregnane-6,20-dione

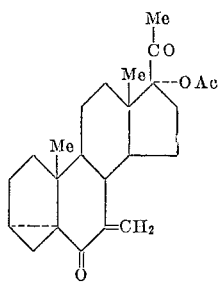

A solution of 17α-acetoxy-3β-p-toluenesulphonyloxy-pregn-5-en-20-one (prepared from 17α-acetoxy-3β-hydroxy-pregn-5-en-20-one by treatment with p-toluenesulphonyl chloride in pyridine) (14 g.) and sodium citrate (17 g.) in acetone (200 ml.) and water (200 ml.) was heated under reflux for 8 hours. The product obtained on diluting the solution with water was crystallised from methanol to give 17α-acetoxy-3α,5-cyclopregnan-6β-ol-20-one, M.P. 204–205° C., [α]$_D^{20}$ −20.3° (c. 1.0 in dioxan).

A solution of the foregoing product (10 g.) in pyridine (100 ml.) was added to a suspension of the complex prepared from chromium trioxide (10 g.) in pyridine (100 ml.), and the mixture was kept at room temperature overnight. The precipitate was filtered off and washed with hot ethyl acetate. The combined filtrate and washings were washed with dilute aqueous hydrochloric acid, aqueous sodium carbonate and water, dried (Na$_2$SO$_4$) and evaporated to dryness. Crystallisation of the residue from methanol gave 17α-acetoxy-3α,5-cyclopregnane-6,20-dione, M.P. 225° C., [α]$_D^{20}$ +15.2° (c. 0.95 in dioxan).

A mixture of the foregoing product (5 g.), paraformaldehyde (2 g.), dimethylamine hydrochloride (10 g.) and dry dioxan (100 ml.) was heated under reflux for 2½ hours and then poured into water. Crystallisation of the precipitated solid from methanol gave 17α-acetoxy-7-methylene-3α,5-cyclopregnane-6,20-dione, M.P. 197° C., [α]$_D^{25}$ +11.6° (c. 1.0 in dioxan).

Example 4.—7-methylene-3α,5-cycloandrostane-6,17-dione

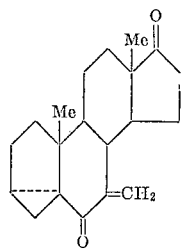

A mixture of 3α,5-cycloandrostane-6,17-dione (58 g.) (Butenandt and Suranyi, Ber., 1942, 75, 591), paraformaldehyde (15 g.), dimethylamine hydrochloride (45 g.) and dry dioxan (600 ml.) was heated under reflux for 2½ hours, and then poured into water. The precipitate was purified from methanol to give 7-methylene-3α,5-cycloandrostane-6,17-dione, M.P. 175° C., [α]$_D^{25}$ +148° (c. 1.0 in dioxan), $\lambda_{max.}^{EtOH}$ 233–4 mμ (ε, 12,390).

Example 5.—7-methylene-3α,5-cyclopregnane-6,20-dione

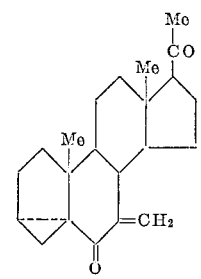

A mixture of 3α,5-cyclopregnane-6,20-dione (19 g.) (Goutarel, Cave, Tan and Leboeuf, Bull. Soc. Chim. France, 1962, 646), paraformaldehyde (6 g.) and dimethylamine hydrochloride (19 g.) in dry dioxan (400 ml.) was heated under reflux for 2½ hours, and then poured into water. The product purified from ether to give 7-methylene-3α,5-cyclopregnane-6,20-dione, M.P. 141° C., [α]$_D^{28}$ +107° (c. 0.9 in chloroform), $\lambda_{max.}^{EtOH}$ 234 mμ (ε, 9080).

We claim:
1. 17α - methyl - 7 - methylene - 3α,5 - cycloandrostan-17β-ol-6-one.
2. 17β-acetoxy-7-methylene-3α,5-cycloandrostan-6-one.
3. 17α - acetoxy - 7 - methylene - 3α,5 - cyclopregnane-6,20-dione.
4. 7-methylene-3α,5-cycloandrostane-6,17-dione.
5. 7-methylene-3α,5-cyclopregnane-6,20-dione.
6. A compound of the formula

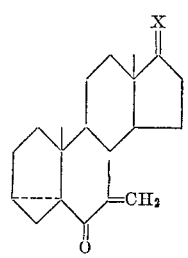

wherein X represents a C-17 substituent selected from the group consisting of (a) $\begin{array}{c} OR \\ \text{---}R_1 \end{array}$ where R is H or lower alkanoyl and $R_1$ is H or lower alkyl;

(b)
$$\begin{array}{c} COCH_3 \\ |\text{--}R_2 \end{array}$$

where $R_2$ is H, hydroxy or lower alkanoyloxy; and (c)
$$\overset{O}{\underset{\|}{}}$$

References Cited

UNITED STATES PATENTS 3,049,555 8/1962 Tyner _____ 260—397.4
3,205,243 9/1965 Riano et al. _____ 260—397.4

LEWIS GOTTS, *Primary Examiner.*

T. MESHBESHER, *Assistant Examiner.*